Sept. 29, 1964 F. O. WISMAN 3,150,738
HYDRAULIC CONTROL SYSTEM FOR VEHICLE THROTTLE
Filed March 25, 1963
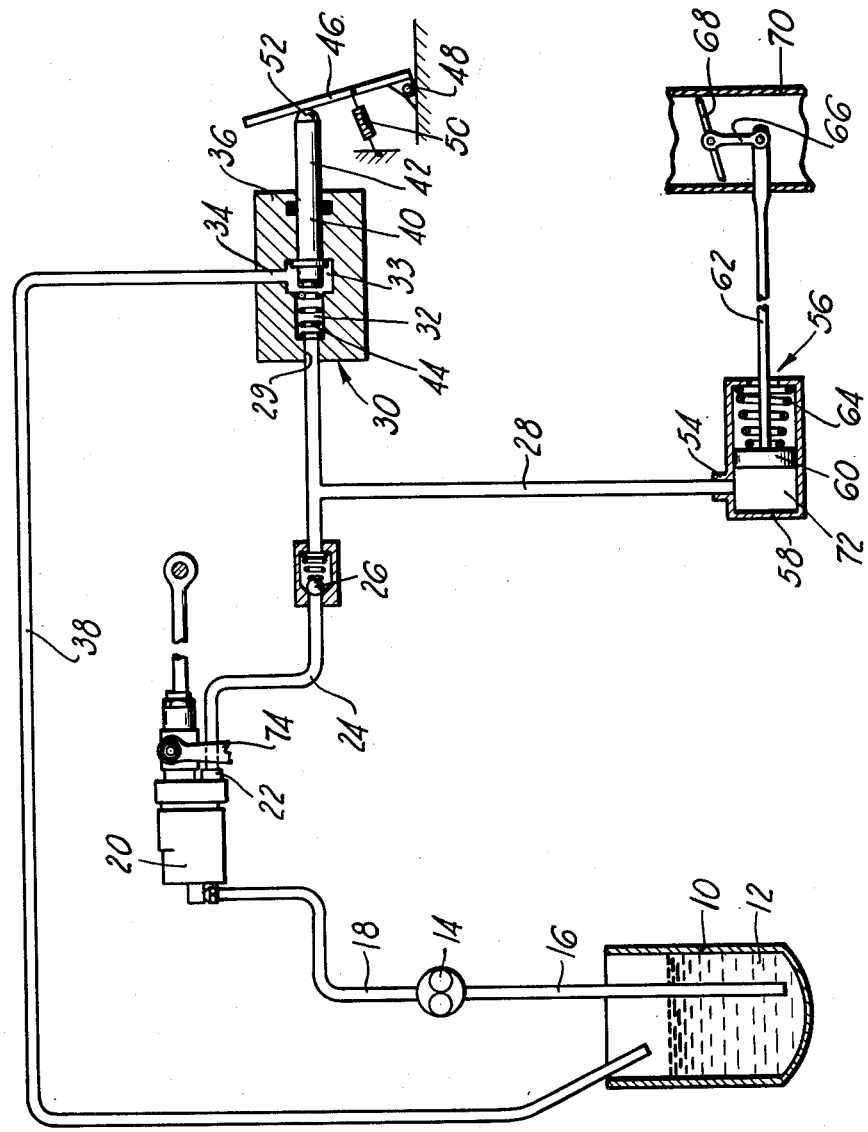
INVENTOR.
FRANKLIN O. WISMAN
BY
ATTORNEY

3,150,738
HYDRAULIC CONTROL SYSTEM FOR VEHICLE THROTTLE

Franklin O. Wisman, South Bend, Ind., assignor to The Bendix Corporation, South Bend, Ind., a corporation of Delaware
Filed Mar. 25, 1963, Ser. No. 267,532
8 Claims. (Cl. 180—77)

This invention relates to a hydraulic control system having means to control a vehicle's throttle.

It is, more particularly, an object of this invention to provide a hydraulic control system for several power systems of a vehicle and, in addition, the throttle for the engine of a vehicle.

It is also an object of this invention to provide a hydraulic control system for the engine throttle which can be isolated from other power systems and, thus, failsafe in operation.

Other advantages and objects will appear to those skilled in the art to which this invention relates from the following description of the drawing illustrating a schematic fluid power system for a vehicle.

More particularly, I show a power system having a fluid reservoir 10 for a suitable hydraulic fluid 12. A gear type pump 14 is connected to the reservoir by a supply conduit 16, and a flow line 18 communicates the pump with a power steering actuator 20.

The power steering actuator is patterned after that shown in U.S. Patent No. 2,867,284. In more detail, I show a power steering actuator having an integral valve and actuator assembly. Regardless of the type of unit, the power steering valve is designed to continuously bypass a portion of the fluid, if not all, as when the actuator 20 is inoperative. The valve bypass is connected to the valve outlet 22, which is in turn connected to a conduit 24.

The conduit 24 is provided with a check valve 26 which only allows flow from the outlet 22 and not to this outlet. In addition, a branch conduit 28 is in flow communication with the conduit 24. The conduit 24 leads to a piston valve assembly 30 and is connected to an inlet 29 for a small diameter chamber 32 therein. As seen, the chamber 32 opens into a large diameter chamber 33 which is provided with an outlet passage 34 in the valve housing 36. The outlet passage is connected to a return line 38 emptying into the reservoir 10 to complete the fluid circuit of my invention.

The piston valve assembly is provided with a tubular piston 40 slidably and sealably mounted in a bore 42 of housing 36. The piston 40 is biased by a spring 44 to the right as seen in the drawing to allow flow from the inlet 29 of chamber 32 to the outlet 34 of chamber 33. The piston is sized to be slidably received by chamber 32 such that it will sealingly engage the walls of the chamber to close off the communication between the inlet and the outlet. To further insure such a seal, rolling seals such as O rings may be provided in grooves adjacent the left end of piston 40.

In a vehicle an accelerator pedal 46 is provided and is hingedly mounted, as at 48. A spring 50 operatively connects the accelerator pedal to surrounding vehicle structure. Both the springs 44 and 50 are matched such that spring 44 is stronger than spring 50, and spring 44 is of a length such that it reaches its free length before spring 50. Thus, as seen in the drawing, when the accelerator pedal is in its engine idle position, the accelerator pedal is being urged to contact a spherical end or roller 52 of piston 40 to maintain a light force against spring 44. In addition, in order to prevent loss of spring 50 during pedal movement, spring 50 is designed to be in a state of slight extension even when the pedal 46 has reached its maximum travel. It is also within the realm of possibility to locate valve assembly 30 such that it will always be in the arc of pedal motion, whereupon the pedal and piston may be releasably connected, as by a familiar ball socket joint presently used in automotive vehicles.

The branch conduit is connected to a port 54 of an actuator 56 consisting of a housing 58, a piston 60, a force transmitting rod 62 and a spring 64 interposed with the housing and the piston. The rod 62 is connected to a throttle lever 66 controlling a butterfly valve 68 in a carburetor housing 70 to vary the speed of an engine (not shown) to which the carburetor is operatively connected, as may be readily realized by those skilled in the art. As seen, the spring 64 is arranged to bias the valve 68 to the closed position shown so that the engine is always at idle unless the operator is forcing the accelerator pedal to move.

While not being so shown, it is preferable to have the reservoir 10 located such that a gravity flow relationship will exist between it and the valve assembly 30. This will, obviously, provide fluid to chambers 32 and 33 and in line 28 and a chamber 72 in the actuator housing 58 regardless of pump operation. In addition, this will allow an operator to pressurize chamber 72 to get throttle actuation while starting the engine, which feature in cold weather is a must.

By way of describing power operation, the vehicle's engine is causing pump 14 to draw fluid from the reservoir. The pump discharges this fluid to the power steering actuator 20 where it will flow freely through until vehicle steering is scheduled, as by steering link 74. Even while steering the pump discharge is not fully demanded by the actuator 20, and, thus a portion of the flow is always available to exhaust port 22. This exhaust flow is then fed through the check valve 26 to the valve assembly 30 and branch line 28. If the accelerator pedal 46 is in the position shown the flow merely returns to the reservoir 10. However, if the pedal is depressed to restrict flow or obstruct flow from chamber 32 to 33 then chamber 72 of actuator 56 is pressurized to cause piston 60 to compress spring 64 and through rod 62 open the throttle valve 68 to increase engine speed.

As may be readily understood by those skilled in the art, other forms may be designed without departing from the true spirit and scope of my invention as respects the form above-described. Therefore, I do not intend to be limited by this description of a method of practicing my invention but rather maintain that the true bounds are presented by the appended claims.

I claim:

1. In a vehicle control apparatus, a hydraulic system comprising in series in a flow path:
   a pump circulating fluid under pressure;
   a pressure responsive power steering mechanism;
   a directional flow controlling device allowing flow from said power steering mechanism and preventing reverse flow to said power steering mechanism, which flow controlling device is in said flow path;
   a pressure responsive throttle actuating mechanism in said flow path; and
   a means for regulating pressure in said throttle actuating mechanism, which means is in said flow path and arranged to form a closed system between said means and said device to operate said throttle independent of said power steering mechanism.

2. In a vehicle a full hydraulic power system comprising:
   a pump drawing fluid from a reservoir and pressurizing and circulating the fluid through a conduit back to the reservoir;

a power steering mechanism operatively connected to said conduit;

a fluid pressure responsive throttle actuating mechanism in flow communication with said conduit downstream of said power steering mechanism said flow communication having a unidirectional check valve preventing flow from the throttle actuating mechanism to said power steering mechanism; and a flow control means for said conduit downstream of said throttle actuating mechanism to close off flow communication to said reservoir, which control means is adapted to pressurize said throttle actuating mechanism to operate same.

3. In a vehicle having a full hydraulic power system, a fluid actuator for a throttle controlling the speed of the vehicle, which actuator comprises:

a fluid reservoir;

a pump in flow communication with said reservoir;

a first power actuator in flow communication with said pump, said first actuator having means to continuously exhaust a flow from said pump;

a check valve operatively connected to said means allowing flow from said exhaust means and preventing flow toward said exhaust means;

a second actuator having a spring biased piston operatively connected to a force transmitting rod;

a piston valve in flow controlling relationship with said second actuator and said reservoir;

a means in said vehicle to control said piston valve, which means is operatively connected to said valve; and a means to connect said force transmitting rod to said throttle whereby control of said means in said vehicle will regulate the speed of said vehicle.

4. A hydraulic power system according to claim 3 and further comprising:

a means to restore said piston valve to a non-flow controlling position whereby any change in the confined volume of fluid in said second actuator may be compensated by renewed communication with said reservoir.

5. In a vehicle control apparatus, a hydraulic system comprising in series in a flow path:

a fluid reservoir;

a pump circulating fluid under pressure from said reservoir;

a pressure responsive power steering mechanism;

a directional flow controlling device allowing flow from said power steering mechanism and preventing reverse flow to said power steering mechanism, which flow controlling device is in said flow path;

a pressure responsive throttle actuating mechanism in communication with said flow path; and a means for regulating pressure in said throttle actuating mechanism including, a cylinder having a bore connected at one end to said throttle actuating mechanism and a side port in said cylinder communicating with said reservoir, and a piston in said bore adapted to first restrict flow through said bore via said side port and thereafter prevent such flow to form a hydraulic link between said means and said throttle actuating mechanism, which hydraulic link is pressurized by either said piston or flow from said directional flow controlling device.

6. A hydraulic system according to claim 5 and further comprising:

a means to restore said piston to the position occupied prior to restriction and closure of said side port whereby any change in the confined volume of fluid in said hydraulic link may be compensated by renewed communication through said side port with said reservoir.

7. A hydraulic system according to claim 5 whereby said throttle actuating mechanism includes, means to accept energy by fluid displacement, and graduating means whereby said actuating mechanism assumes a predeterminate position in response to each value of applied fluid pressure.

8. A hydraulic system according to claim 7 whereby said graduating means is characterized as a spring.

References Cited in the file of this patent

UNITED STATES PATENTS

| | | |
|---|---|---|
| Re. 25,162 | Forster | Apr. 17, 1962 |
| 2,244,213 | Patton | June 3, 1941 |
| 2,521,593 | McNutt | Sept. 5, 1950 |
| 2,624,361 | Brown | Jan. 6, 1953 |
| 2,737,196 | Eames | Mar. 6, 1956 |